US007986499B2

(12) United States Patent
Wang et al.

(10) Patent No.: US 7,986,499 B2
(45) Date of Patent: Jul. 26, 2011

(54) CURRENT LIMITING CIRCUIT AND VOLTAGE REGULATOR USING THE SAME

(75) Inventors: Zhao Wang, Beijing (CN); Hang Yin, Beijing (CN); Wenbo Tian, Beijing (CN)

(73) Assignees: Vimicro Corporation, Beijing (CN); Wuxi Vimicro Corporation, Jiangsu (CN)

( * ) Notice: Subject to any disclaimer, the term of this patent is extended or adjusted under 35 U.S.C. 154(b) by 245 days.

(21) Appl. No.: 12/343,273

(22) Filed: Dec. 23, 2008

(65) Prior Publication Data

US 2009/0167263 A1 Jul. 2, 2009

(30) Foreign Application Priority Data

Dec. 27, 2007 (CN) .......................... 2007 1 0304347

(51) Int. Cl.
*H02H 9/08* (2006.01)

(52) U.S. Cl. ......................................... 361/18; 361/93.9

(58) Field of Classification Search ........ 361/93.7–93.9; 323/278, 282

See application file for complete search history.

(56) References Cited

U.S. PATENT DOCUMENTS

| | | | | |
|---|---|---|---|---|
| 6,046,577 | A * | 4/2000 | Rincon-Mora et al. | 323/282 |
| 6,522,111 | B2 * | 2/2003 | Zadeh et al. | 323/277 |
| 2006/0043945 | A1 * | 3/2006 | Sohn et al. | 323/273 |
| 2007/0206338 | A1 * | 9/2007 | Ishino | 361/93.9 |

* cited by examiner

*Primary Examiner* — Danny Nguyen

(74) *Attorney, Agent, or Firm* — Wuxi Sino IP, Ltd.; Joe Zheng

(57) ABSTRACT

Techniques pertaining to a voltage regulator with a current limiting circuit having low quiescent current are disclosed. According to one aspect of the present invention, a current limiting circuit is provided for limiting a current passing through an output pass circuit of a voltage regulator, the current limiting circuit comprises: a current sampling circuit for sampling the current passing through the output pass circuit to obtain a duplicated current being proportional to the current passing through the output pass circuit; a current mirror circuit for producing a mirror current being proportional to the duplicated current with the duplicated current as a reference current; a current to voltage converter for producing a voltage being proportional to the mirror current; and a voltage comparator for comparing the voltage produced by the current to voltage converter with a threshold voltage and turning off the output pass circuit when the voltage produced by the current to voltage converter is larger than or equal to the threshold voltage.

17 Claims, 7 Drawing Sheets

CURRENT LIMITING CIRCUIT AND VOLTAGE REGULATOR USING THE SAME

BACKGROUND OF THE INVENTION

1. Field of the Invention

The present invention is related to integrated circuit design techniques, more particularly to a voltage regulator with a current limiting circuit having low quiescent current.

2. Description of Related Art

With more uses of portable electronic devices, engineers start to pay more and more attention to the design of standby power consumption of the portable electronic devices. The standby power consumption directly influences an operating time of the portable electronic devices. Battery capacity of the portable electronic devices is very limited, so it needs to reduce quiescent currents of various electronic components of the portable electronic device as much as possible. Hence, various power management integrated circuits are used in the portable electronic devices, such as low dropout voltage regulators or DC-DC converters etc., to continuously reduce the quiescent current during light loading.

A low dropout voltage regulator is taken as an example for illustration hereafter. The voltage regulator comprises a reference voltage source, an error amplifier, an output pass circuit, a sampling resistor and a bypass circuit. The error amplifier may be a comparator. A reference voltage provided by the reference voltage source is coupled to an inverse input of the comparator. A sampling voltage obtained by sampling an output voltage of the output pass circuit via the sampling resistor is coupled to a non-inverse of the comparator, thereby a negative feedback loop is formed. A difference between the reference voltage and the sampling voltage is amplified by the error amplifier to control the output pass circuit until the output voltage of the output pass circuit goes to stabilization. The output pass circuit may be implemented by a bipolar transistor or a Metal-Oxide Semiconductor Field Effect Transistor (MOSFET).

Additionally, it is necessary for the low dropout voltage regulator or the DC-DC converter to employ a current protection circuit, also referred as a current limiting circuit, which can effectively limit the current passing through the output pass circuit of the low dropout voltage regulator or the DC-DC converter during short circuit or overload. However, the conventional current limiting circuit may have a great quiescent current when the power management IC, such as the low dropout voltage regulator or the DC-DC converter, is under no load condition.

Referring to FIG. 1, a circuit diagram shows a prior art low dropout voltage regulator 100 with a current limiting circuit, either the current limiting circuit or a current source 18 therein may introduce a great quiescent current.

Thus, improved techniques for the current limiting circuit are desired to overcome at least the above disadvantages.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to a voltage regulator with a current limiting circuit having low quiescent current. According to one aspect of the present invention, a current limiting circuit is provided for limiting a current passing through an output pass circuit of a voltage regulator, the current limiting circuit comprises: a current sampling circuit for sampling the current passing through the output pass circuit to obtain a duplicated current being proportional to the current passing through the output pass circuit; a current mirror circuit for producing a mirror current being proportional to the duplicated current with the duplicated current as a reference current; a current to voltage converter for producing a voltage being proportional to the mirror current; and a voltage comparator for comparing the voltage produced by the current to voltage converter with a threshold voltage and turning off the output pass circuit when the voltage produced by the current to voltage converter is larger than or equal to the threshold voltage.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the present invention are discussed herein with reference to FIGS. 2-7. However, those skilled in the art will readily appreciate that the detailed description given herein with respect to these figures is for explanatory purposes only as the invention extends beyond these limited embodiments.

A current limiting circuit provided according to one embodiment of the present invention can be applied in various voltage regulators, such as a DC-DC converter or low dropout voltage regulator etc., which employs an output pass circuit implemented by transistor, such as a bipolar transistor or a MOS field effect transistor.

Figure 1:
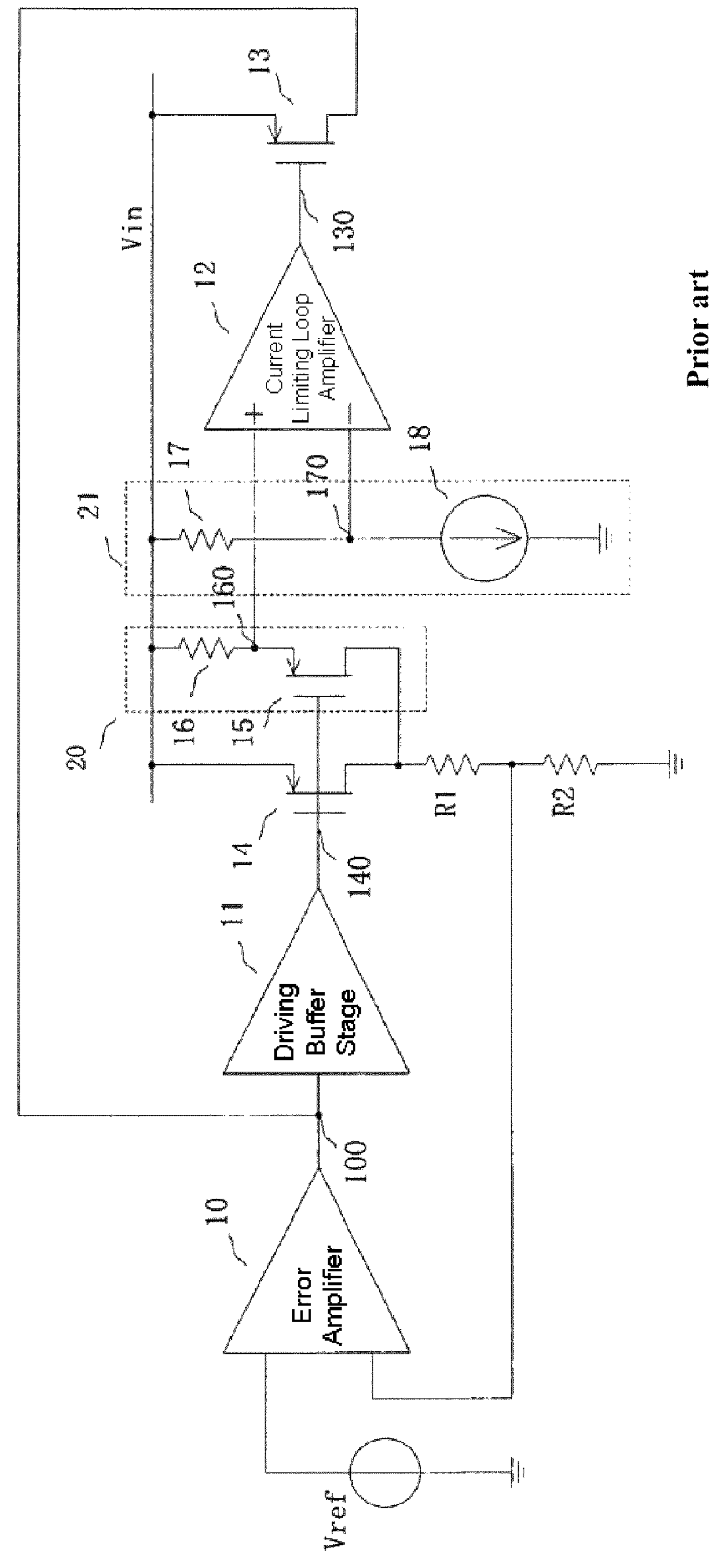
Prior art FIG. 1
FIG. 1 is a circuit diagram showing a low dropout voltage regulator with a current limiting circuit in the prior art.
Figure 2:
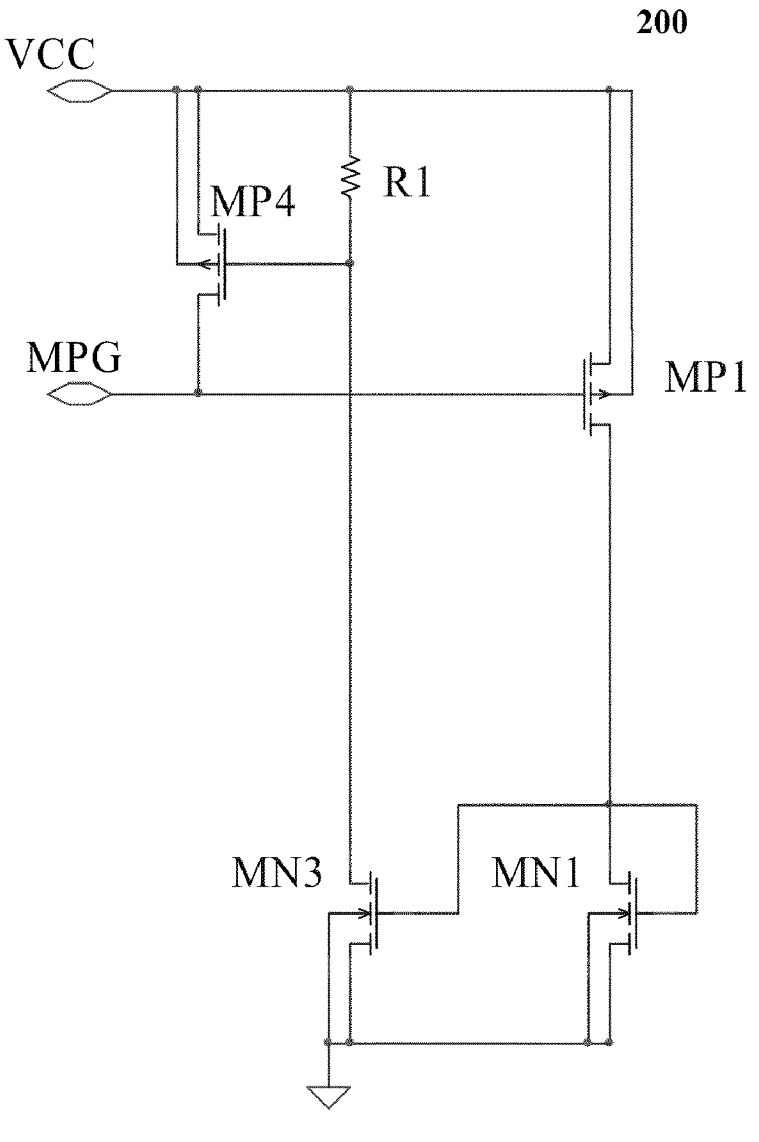
FIG. 2 is a circuit diagram showing a current limiting circuit according to one embodiment of the present invention.
Figure 4:
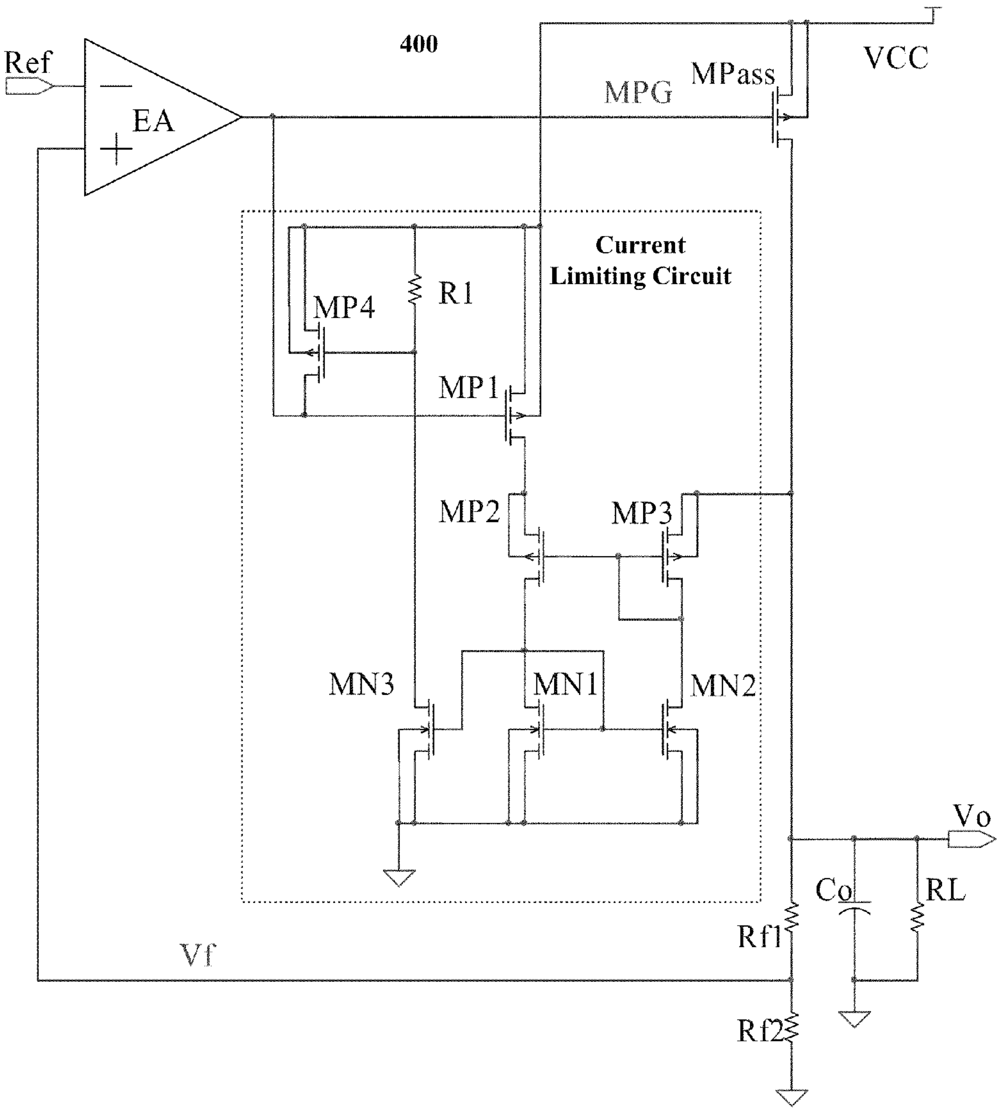
FIG. 4 is a circuit diagram showing a low dropout voltage regulator with the current liming circuit shown in FIG.

FIG. 2 is a circuit diagram showing a current limiting circuit 200 in one embodiment of the present invention. Referring to FIG. 2, the current limiting circuit 200 comprises a current sampling circuit which includes a MOS field effect transistor MP1. The MOSFET MP1 is configured to sample a current passing through the output pass circuit MPass of the low dropout voltage regulator or a DC-DC converter (as shown in FIG. 4), thereby a current passing through the MOSFET MP1 is proportional to that passing through the output pass circuit MPass. In this embodiment, the MOSFET MP1 and the output pass circuit both are P-channel MOS field effect transistors. Referring to FIG. 4, the output pass circuit 400 is connected between an input voltage VCC and an output voltage Vo. A control terminal, namely a gate MPG, of the output pass circuit MPass is coupled to an output terminal of an error amplifier. A source terminal of the output pass circuit MPass is coupled to the input voltage VCC, and a drain terminal of the output pass circuit MPass is coupled to the output voltage Vo. A gate terminal of the MOSFET MP1 is coupled to the gate terminal MPG of the output pass transistor MPass, and a source terminal of the MOSFET MP1 is coupled to the source terminal the output pass transistor MPass.

According to the inherent current characteristic of the MOS field effect transistor, the ratio of the current passing through the MOSFET MP1 to the current passing through the output pass circuit MPass is equal to the ratio of a channel width to length ratio $(W/L)_{MP1}$ of the MOSFET MP1 to a channel width to length ratio $(W/L)_{MPass}$ of the output pass circuit MPass when the MOSFET MP1 and the output pass circuit MPass have a same threshold voltage $V_{GS(th)}$. Thus, it is relatively easy to change the ratio of the current passing through the MOSFET MP1 to the current passing through the output pass circuit MPass by selecting physical sizes of the MOSFET MP1 and the output pass circuit MPass. In one preferred embodiment, the current passing through the MOSFET MP1 is designed to be equal to or less than 1/1000 of the current passing through the output pass circuit MPass by selecting proper physical sizes.

Referring to FIG. 2, the current limiting circuit further comprises a current mirror circuit, a current to voltage converter and a voltage comparator. The current mirror circuit is coupled to the current sampling circuit for generating a mirror current being proportional to the current passing through the current sampling circuit with the current passing through the current sampling circuit as a reference current. The current to voltage converter is coupled to the current mirror circuit for generating a voltage being proportional to the mirror current. The voltage comparator is coupled to the current to voltage converter and the control terminal MPG of the output pass circuit MPass for comparing the voltage generated by the current to voltage converter with a threshold voltage. When the voltage generated by the current to voltage converter is larger than the threshold voltage, the voltage comparator pulls a voltage on the control terminal MPG of the output pass circuit MPass up to a predetermined voltage value.

In the embodiment shown in FIG. 2, the current mirror circuit is formed by a pair of N-channel MOS field effect transistors MN1, and MN3. The current to voltage converter is formed by a resistor R1. The voltage comparator is formed by a P-channel MOS field transistor MP4. A drain terminal of the MOSFET MN1 is coupled to the drain terminal of the MOSFET MP1, a source terminal of the MOSFET MN1 is grounded, and a gate terminal of the MOSFET MN1 is coupled to a gate terminal of the MOSFET MN2 and the drain terminal of the MOSFET MN1. A source terminal of the MOSFET MN3 is grounded, and a drain terminal of the MOSFET MN3 is coupled to one terminal of the resistor R1 and a gate terminal of the MOSFET MP4, the other terminal of the resistor R1 is coupled to the input voltage VCC. A source terminal of the MOSFET MP4 is coupled to the input voltage VCC, and a drain terminal of the MOSFET MP4 is coupled to the control terminal MPG of the output pass circuit MPass.

In operation, the current passing through the MOSFET MN1 is equal to the current passing through the MOSFET MP1. The ratio of the current passing through the MOSFET MN3 to the current passing through the MOSFET MN1 is equal to the ratio of a channel width to length ratio $(W/L)_{MN3}$ of the MOSFET MN3 to a channel width to length ratio (W/L) MN1 of the MOSFET MN1. A voltage drop is formed on the resistor R1 when the current passing through the MOSFET MN3 passes through the resistor R1. The voltage drop on the resistor R1 is provided as a bias voltage between the gate terminal and the source terminal of the MOSFET MP4. The MOSFET MP4 compares the voltage drop on the resistor R1 with an absolute value $|V_{GS(th)MP4}|$ of the threshold voltage and determines whether the voltage on the control terminal MPG should be pulled up according to a comparison result. When the voltage drop on the resistor R1 goes up to the absolute value $|V_{GS(th)MP4}|$ of the threshold voltage, the MOSFET MP4 turns on, thereby the voltage on the drain terminal of the MOSFET MP4 (the gate terminal MPG of the output pass circuit MPass) is pulled up to approximate to the input voltage VCC because the voltage drop on the MOSFET MP4 is very small. Thereby, the maximum allowable output current $I_{Limit}$ of the current limiting circuit about is:

$$I_{Limit} = \frac{|V_{GS(th)MP4}|}{R1} \cdot \frac{(W/L)_{MN1}}{(W/L)_{MN3}} \cdot \frac{(W/L)_{MPass}}{(W/L)_{MP1}}$$

where $|V_{GS(th)MP4}|$ is the absolute value of the threshold voltage of the MOSFET MP4, R1 is a resistance value of the resistor R1, $(W/L)_{MN1}$ is the channel width to length ratio of the MOSFET MN1, $(_{W/L})_{MN3}$ is the channel width to length ratio of the MOSFET MN3, $(W/L)_{Mpl}$ is the channel width to length ratio of the MOSFET MP1, and $(W/L)_{M\ Pass}$ is the channel width to length ratio of the output pass circuit MPass.

The absolute value $|V_{GS(th)MP4}|$ usually has a negative temperature coefficient. The resistor R1 having a negative temperature coefficient is preferably selected for temperature compensation purpose, whereby the influence on the current limiting circuit introduced by changes of temperature is substantially eliminated. In another embodiment, two or more resistors with different temperature coefficients may be provided to constitute the resistor R1. For example, the resistor R1 may be constituted by one polycrystal resistor with the negative temperature coefficient and one N-cell resistor with the positive temperature coefficient.

The term of $$\frac{(W/L)_{MN1}}{(W/L)_{MN3}}\cdot\frac{(W/L)_{MPass}}{(W/L)_{MP1}}$$

in the maximum allowable output current $I_{Limit}$ is only relative to the channel width to length ratios of the MOSFET MN1, MN3, MP3 and MP3 and hasn't any relation to the manufacturing process, power voltage and temperature. The change of the other term of $$\frac{|V_{GS(th)MP4}|}{R1}$$

in the maximum allowable output current $I_{Limit}$ is equivalent with that of most bias currents. However, there are only a few times of current duplications by the mirror current circuit in the present invention, and the deviation caused thereby is decreased as much as possible. Hence, the accuracy of the current limiting circuit is enhanced. As a result, the manufacturing process almost has no influence on the current limiting circuit of the present invention, and different current limiting circuits of the present invention have better consistency. Furthermore, a terminal may be led out from the resistor R1 for trimming the resistance of the resistor R1 after production in order to enhance accuracy of the current limiting circuit.

As described above, when the current passing through the output pass circuit MPass is zero, the current passing through the MOSFET MP1 should be zero too, the currents respectively passing through the MOSFETs MN1 and MN3 both are zero correspondingly, so the voltage drop on the resistor R1 should be zero and the MOSFET MP4 is in off state. As a result, the current limiting circuit has no any current consumption. However, the low dropout voltage regulator or the DC-DC converter usually comprises a feed back circuit, such as a pair of resistors $R_{f1}$ and $R_{f2}$ shown in FIG. 4. Even if the load current of the low dropout voltage regulator or the DC-DC converter is zero, the current passing through the output pass circuit MPass isn't zero yet. But the current passing through the output pass circuit MPass is very small at this time and equal to a current consumed by the feed back circuit. Provided that the current consumed by the feed back circuit is 1 μA, the ratio of $(W/L)_{MP1}$ to $(W/L)_{MPass}$ is 1/1000, and the ratio of $(W/L)_{MN3}$ to $(W/L)_{MN1}$ is 1/10, so the current passing through the MOSFET MP1 is 1 nA, the current passing through the MOSFET MN3 is 0.1 nA and the total quiescent current consumption of the current limiting circuit is 1.1 nA. The current of nanoampere order can be neglected in most applications. In some embodiments, the total quiescent current consumption of the current limiting circuit can be further reduced by decreasing the ratio of $(W/L)_{MP1}$ to $(W/L)_{MPass}$ and the ratio of $(W/L)_{MN3}$ to $(W/L)_{MN1}$. For example, the ratio of $(W/L)_{MP1}$ to $(W/L)_{MPass}$ may be designed to be 1/10000, and the ratio of $(W/L)_{MN3}$ to $(W/L)_{MN1}$ may be designed to be 1/10, thus the total quiescent current consumption of the current limiting circuit is 0.11 nA.

In one embodiment, the channel length of the MOSFET MN1 and MN3 is designed to be larger, and it helps to reduce the channel length modulation effect. Thus, the proportional relation between the currents passing through the MOSFET MN1 and MN3 may become more accurate. For better current matching in design, the MOS field effect transistors MN1 and MN3 consist of single unit devices having uniform width and length. The number of the single unit devices in the MOSFET MN1 may be different from that in the MOSFET MN3. For example, the width and the length of the single unit device respectively are W=20 μm, L=4 μm, the number of the single unit devices in the MOSFET MN1 is $m_{MN1}$=40, the number of the single unit devices in the MOSFET MN1 is $m_{MN3}$=1. Thus, the current passing through the MOSFET MN1 is 40 times than that passing through the MOSFET MN3.

For further improving the response speed of the current limiting circuit, the channel length of the MOSFET MP4 usually is designed to be smaller so that the channel width to length ratio of the MOSFET MP4 is a larger value. For example, the width and the length of the MOSFET MP4 respectively are W=10 μm, L=0.5 μm, so the channel width to length ratio of the MOSFET MP4 is 20.

Figure 3:
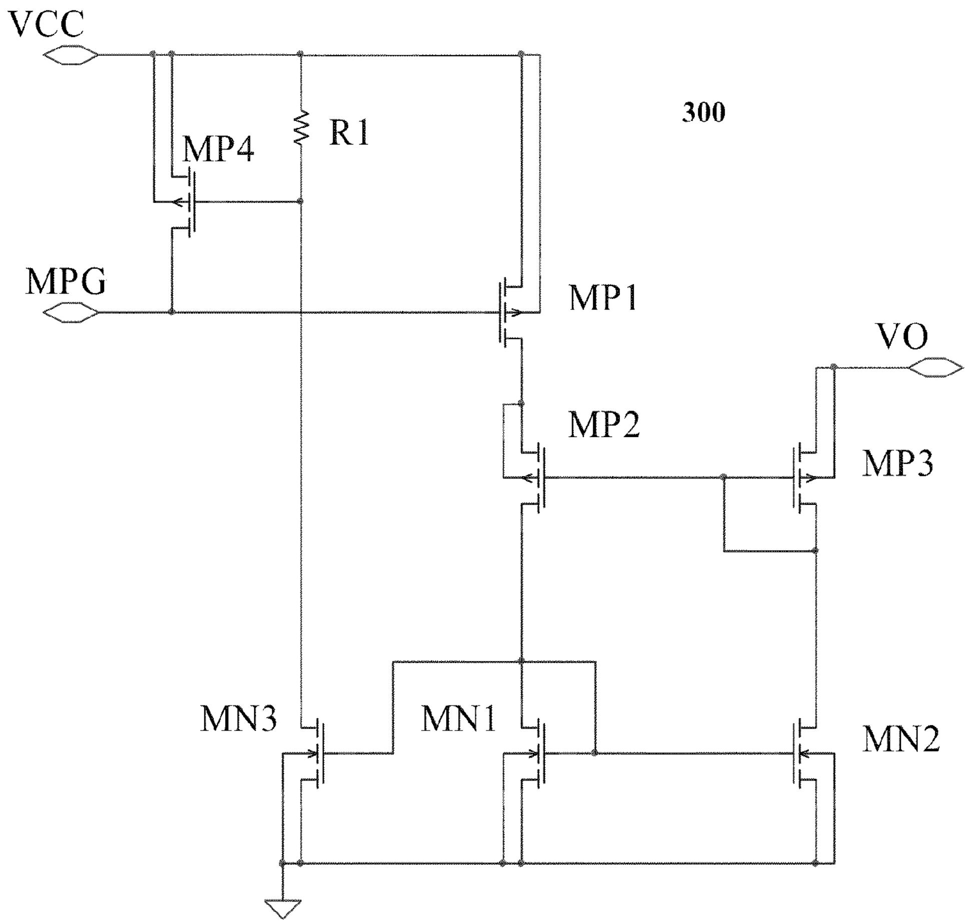
FIG. 3 is a circuit diagram showing the current limiting circuit in another embodiment of the present invention.

FIG. 3 is a circuit diagram showing the current limiting circuit in another embodiment of the present invention. FIG. 4 is a circuit diagram showing a low dropout voltage regulator with the current liming circuit shown in FIG. 3. The current limiting circuit shown in FIG. 3 is identical with that shown in FIG. 2 except that the former introduces a pair of P-channel MOS field effect transistors MP2 and MP3, and a N-channel MOS field effect transistor MN2. A source terminal of the MOSFET MP2 is coupled to the drain terminal of the MOSFET MP1, a drain terminal of the MOSFET MP2 is coupled to the drain terminal of the MOSFET MN1, and a gate terminal of the MOSFET MP2 is coupled to a gate terminal of the MOSFET MP3. A source terminal of the MOSFET MP3 is coupled to the drain terminal (namely the output voltage Vo) of the output pass circuit shown in FIG. 4, a drain terminal of the MOSFET MP3 is coupled to the gate terminal of the MOSFET MP3 and a drain terminal of the MOSFET MN2. A gate terminal of the MOSFET MN2 is coupled to the gate terminal of the MOSFET MN1, and a source terminal of the MOSFET MN2 is coupled to the source terminal of the MOSFET MN1. The MOSFET MN2 and the MOSFET MN1 form another current mirror circuit to provide a bias current for the MOSFET MP3. The MOSFET MP3 and the MOSFET MP2 are configured for ensuring that the voltage on the drain terminal of the MOSFET MP1 is equal to that on the drain terminal of the output pass circuit MPass, thereby the proportional relation between the currents passing through the MOSFET MP1 and the output pass circuit MPass may become more accurate.

Normally, it designs that $(W/L)_{MP2}/(W/L)_{MP3}=(W/L)_{MN1}/(W/L)_{MN2}$, wherein $(W/L)_{MP2}$ is the channel width to length ratio of the MOSFET MP2, and $(W/L)_{MP3}$ is the channel width to length ratio of the MOSFET MP3.

Besides the current limiting circuit, the low dropout voltage regulator shown in FIG. 4 further comprises an error amplifier, an output pass circuit MPass mentioned above, and a feed back circuit. The source terminal of the output pass circuit MPass is coupled to the input voltage VCC, and the drain terminal of the output pass circuit MPass is coupled to the output voltage Vo. The feedback circuit comprises a pair of resistor Rf1 and Rf2 connected in series between the output voltage Vo and the ground. An inverse input of the error amplifier is coupled to a reference voltage Ref, a non-inverse input of the error amplifier is coupled to a feedback voltage Vf provided by the feedback circuit Rf1 and Rf2. An output of the error amplifier is coupled to the gate terminal MPG of the output pass circuit MPass. Additionally, a load resistor RL and an output capacitor Co are connected in series between the output voltage Vo and the ground. The ordinary people skilled in the art will readily appreciate how to control the output pass circuit MPass to produce the proper output voltage Vo, so it is omitted hereafter for simplicity.

Figure 5:
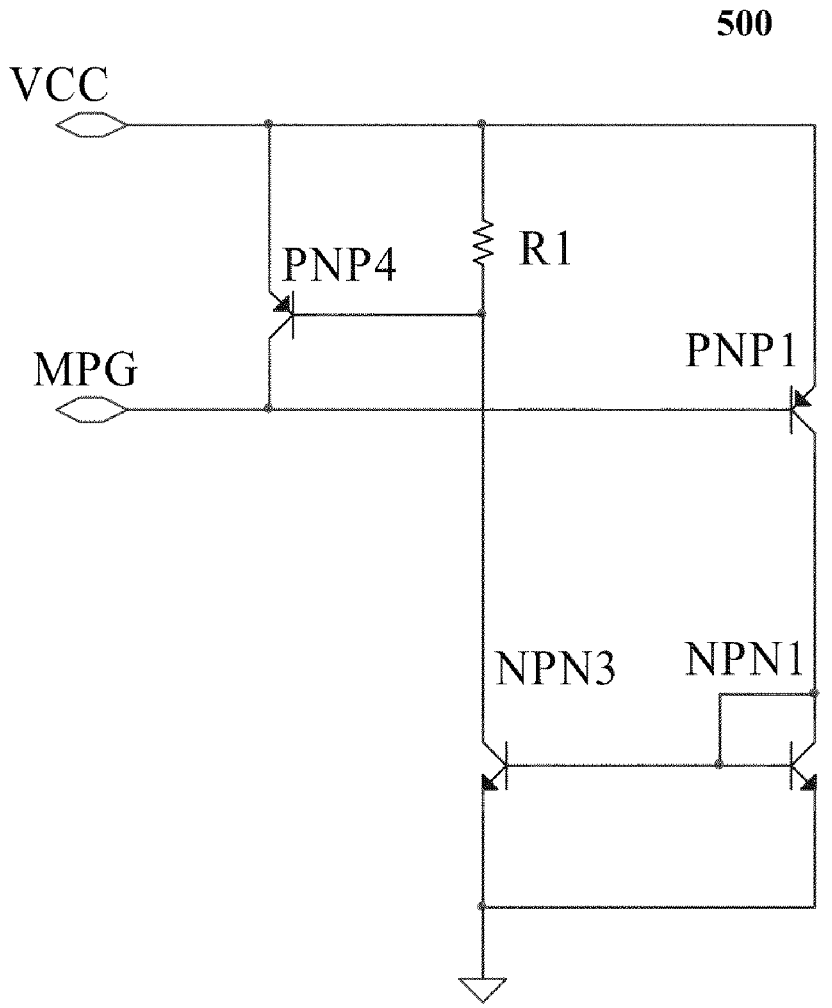
FIG. 5 is a circuit diagram showing the current limiting circuit in still another embodiment of the present invention.
Figure 6:
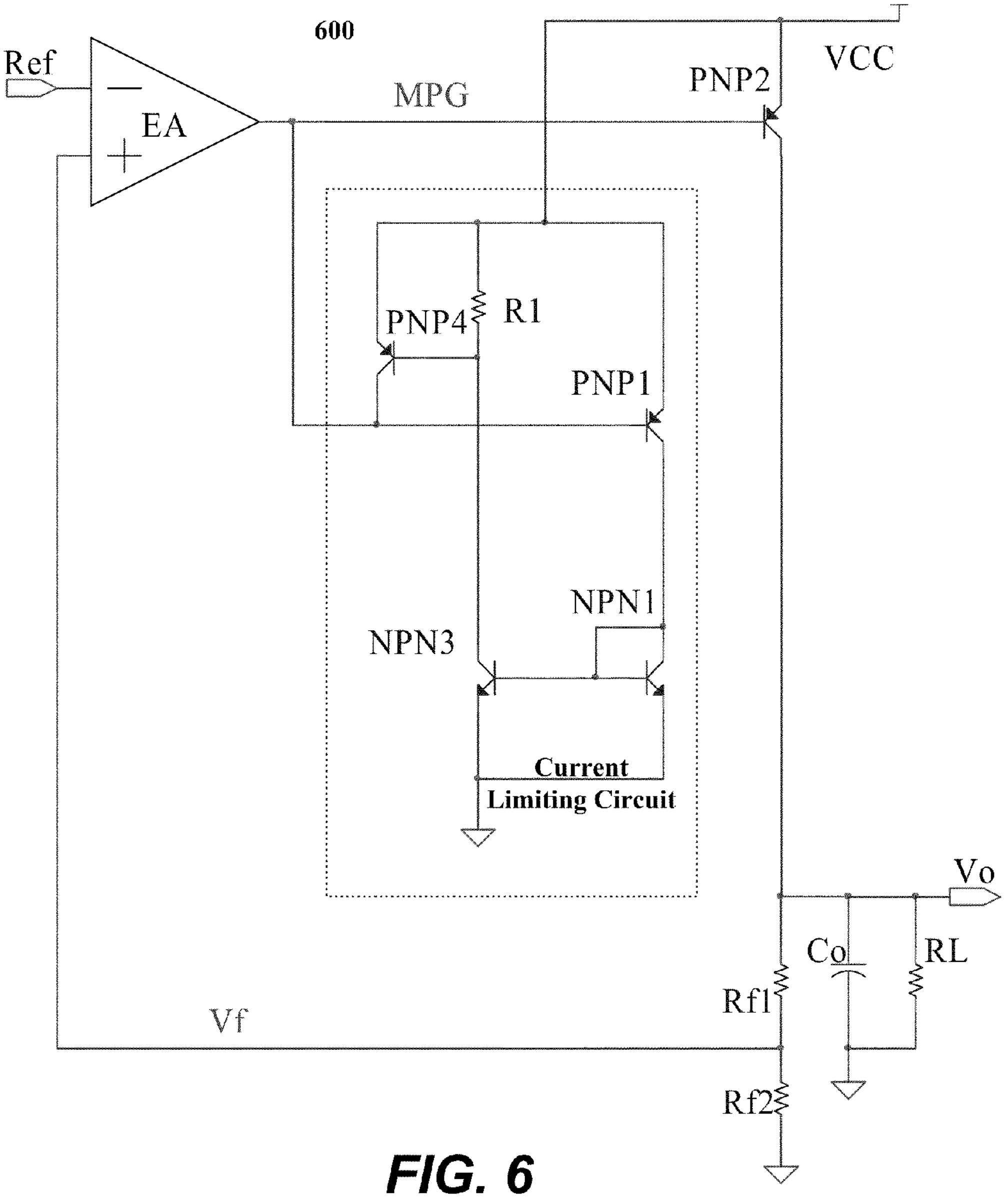
FIG. 6 is a circuit diagram showing the low dropout voltage regulator with the current liming circuit shown in FIG. 5.

FIG. 5 is a circuit diagram showing the current limiting circuit in still another embodiment of the present invention. FIG. 6 is a circuit diagram showing the low dropout voltage regulator with the current liming circuit shown in FIG. 5. The current limiting circuit shown in FIG. 5 can be used in the low dropout voltage regulator or the DC-DC converter, which employs the output pass circuit implemented by the bipolar transistor PNP2. Comparing with the current limiting circuit shown in FIG. 2, the current limiting circuit shown in FIG. 5 employs PNP transistors PNP4 and PNP1 to replace the P-channel MOS field effect transistors MP1 and MP4 respectively, and employs NPN transistors NPN1 and NPN3 to replace the N-channel MOS field effect transistors MN1 and MN3 respectively. The resistor R1, the bipolar transistors PNP1, PNP4, NPN1 and NPN3 shown in FIG. 5 and FIG. 6 correspond to the resistor R1, the MOS field effect transistors MP1, MP4, MN1 and MN3 shown in FIG. 2, respectively. Specifically, a base, an emitter and a collector of the bipolar transistor correspond to the gate terminal, the source terminal and the drain terminal of the MOS field effect transistor, respectively. As shown in FIG. 5 and FIG. 6, the bipolar transistor PNP1 works as the current sampling circuit, the bipolar transistors NPN1 and NPN3 forms the current mirror circuit, the bipolar transistor PNP4 works as the voltage comparator, and the resistor R1 works as the current to voltage converter. Likewise, the voltage drop on the resistor R1 is provided as a bias voltage between the base and the emitter of the bipolar transistor PNP4. The bipolar transistor PNP4 compares the voltage drop on the resistor R1 with an absolute value $|V_{bePNP4}|$ of the threshold voltage thereof and determines whether the voltage on the control terminal MPG should be pulled up according to a comparison result.

With reference of the relative description regarding to FIGS. 2 and 4 and the current characteristic of the bipolar transistor, the ratio of the current passing through the bipolar transistor PNP1 to the current passing through the output pass circuit PNP2 is equal to the ratio of the emitter area of the bipolar transistor PNP1 to the emitter area of the output pass circuit PNP2, the current passing through the bipolar transistor NPN1 is equal to the current passing through the bipolar transistor PNP1, and the ratio of the current passing through the bipolar transistor NPN3 to the current passing through the current passing through the bipolar transistor NPN1 is equal to the ratio of the emitter area of the bipolar transistor NPN3 to the emitter area of the output pass circuit NPN1. A voltage drop is formed on the resistor R1 when the current passing through the bipolar transistor NPN3 passes through the resistor R1. When the dropout voltage on the resistor R goes up to the absolute value $|V_{bePNP4}|$ of the threshold voltage of the bipolar transistor PNP4, the voltage on the control terminal MPG will be pulled up.

The circuits and relative considerations in FIG. 5 and FIG. 6 are same or similar to that in FIG. 2 and FIG. 4 in other aspects. Hence, it is omitted hereafter for simplicity.

Figure 7:
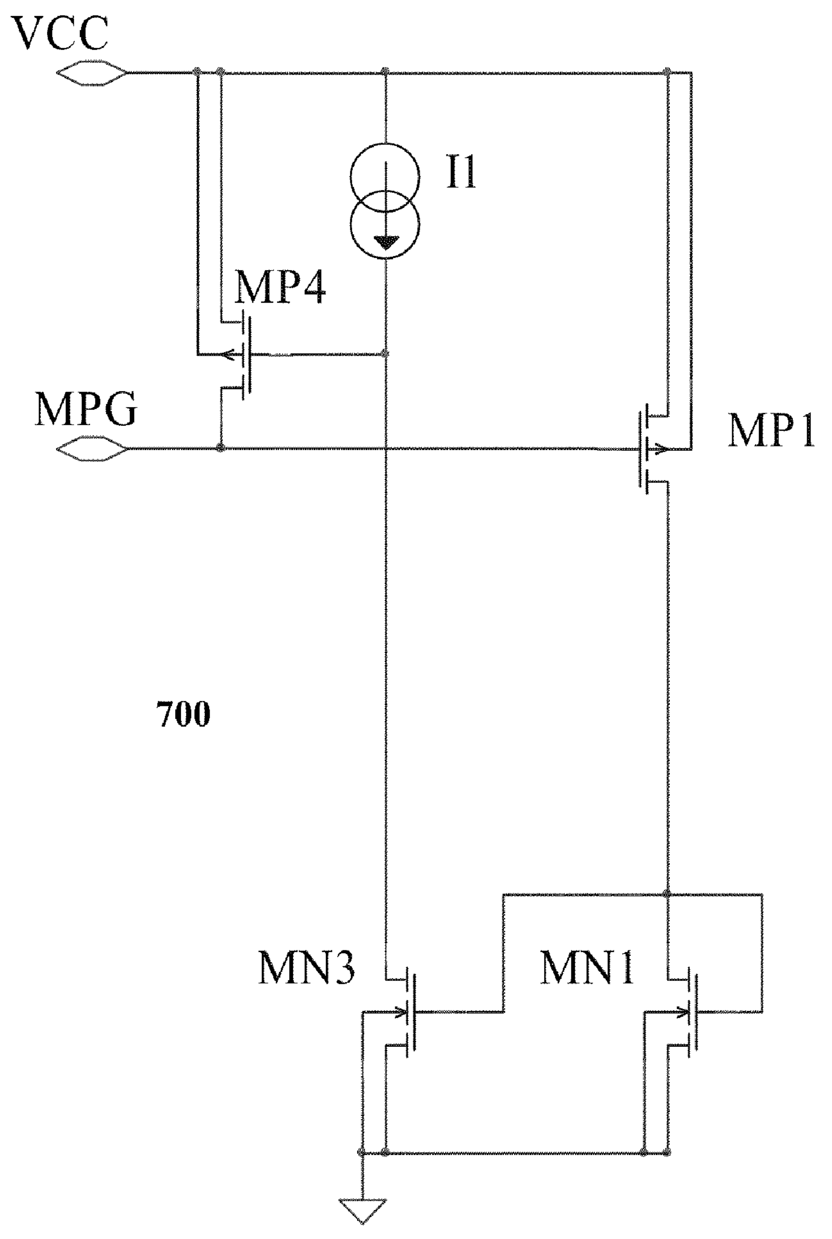
FIG. 7 is a circuit diagram showing the current limiting circuit in yet another embodiment of the present invention.

FIG. 7 is a circuit diagram showing the current limiting circuit 700 in yet another embodiment of the present invention. The current limiting circuit shown in FIG. 7 is identical with that shown in FIG. 2 except that the former employs a current source I1 to replace the resistor R1. In this embodiment, the MOSFET MP4 works as a current comparator rather than the voltage comparator as mentioned above.

A positive terminal of the current source is coupled to the source terminal of the MOSFET MP4, and a negative terminal of the current source is coupled to the gate terminal of the MOSFET MP4. The MOSFET MP4 is configured for comparing the mirror current passing through the MOSFET MN3 with the current of the current source and pulling up the voltage on the control terminal MPG to a predetermined voltage value when the mirror current passing through the MOSFET MN3 is larger than the current of the current source. When the current passing through the MOSFET MN3 is less than that of the current source I1, the gate voltage of the MOSFET MP4 is pulled up to the input voltage VCC by the current source, and the MOSFET MP4 is in off state. At this time, the current passing through the output pass circuit has not any limitation. When the current passing through the MOSFET MN3 is larger than that of the current source I1, the gate voltage of the MOSFET MP4 is pulled down to the ground by the current source. As a result, the MOSFET MP4 turns on to pull the control terminal MPG up to approximate to the input voltage VCC, and the current passing through the output pass circuit is limited. Thereby, the maximum allowable output current $I_{Limit}$ of the current limiting circuit shown in FIG. 7 about is:

$$I_{Limit} = I1 \cdot \frac{(W/L)_{MN1}}{(W/L)_{MN3}} \cdot \frac{(W/L)_{MPass}}{(W/L)_{MP1}}$$

wherein I1 is the current value of the current source.

In order to make a temperature compensation for the current limiting threshold, the current source drifting smaller along with changes of the temperature is employed. Additionally, the term of I1 in the maximum allowable output current $I_{Limit}$ may drift greatly due to changes of the manufacturing process. For improving accuracy of the current limiting threshold, a terminal may be led out from the current source I1 for trimming after production. Usually, the change of ±30% of the current limiting threshold may be acceptable for most applications, thereby a reference current source in a normal integrated circuit also can satisfy the accuracy requirement of the current limiting threshold of the present invention.

The circuits and relative considerations in FIG. 7 are same or similar to that in FIG. 2 in other aspects. Hence, it is omitted hereafter for simplicity.

For improving the accuracy of the proportional relation between the currents passing through the MOSFET MP1 and the output pass circuit MPass, a pair of P-channel MOS field effect transistors MP2 and MP3, and a N-channel MOS field effect transistor MN2 are introduced into the circuit limiting circuit shown in FIG. 7 as that shown in FIG. 3.

Thus, the current limiting circuit of the present invention doesn't employ a complex current limiting loop circuit as the conventional current limiting circuit, thereby greatly saving the area of the integrated circuit. Additionally, the current limiting circuit of the present invention doesn't employ a base bias current as the conventional current limiting circuit, thereby having no influence on the design of the base bias current circuit of other circuits.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A current limiting circuit for limiting a current passing through an output pass circuit of a voltage regulator, the current limiting circuit comprising:

a current sampling circuit for sampling the current passing through the output pass circuit to obtain a duplicated current being proportional to the current passing through the output pass circuit, wherein the output pass circuit is a P-channel MOSFET MPass, the current sampling circuit is a P-channel MOSFET MP1;

a current mirror circuit for producing a mirror current being proportional to the duplicated current with the duplicated current as a reference current;

a current to voltage converter for producing a voltage being proportional to the mirror current, wherein the current to voltage converter is formed by a resistor connected between a gate terminal and a source terminal of a MOSFET, the voltage is being produced when the mirror current goes though the resistor; and a voltage comparator for comparing the voltage produced by the current to voltage converter with a threshold voltage and turning off the output pass circuit when the voltage produced by the current to voltage converter is larger than or equal to the threshold voltage, wherein the voltage comparator includes the MOSFET, wherein the voltage comparator is a P-channel MOSFET MP4, the resistor is referred to as a resistor R1, and the current mirror circuit is formed by a pair of N-channel MOSFETs MN1 and MN3, and wherein a source terminal of the MOSFET MPass is coupled to an input voltage, and a drain terminal of the MOSFET MPass is coupled to an output voltage;

a gate terminal of the MOSFET MP1 is coupled to a gate terminal of the MOSFET MPass, and a source terminal of the MOSFET MP1 is coupled to the source terminal of the MOSFET MPass;

a drain terminal of the MOSFET MN1 is coupled to a drain terminal of the MOSFET MP1, a source terminal of the MOSFET MN1 is grounded, and a gate terminal of the MOSFET MN1 is coupled to a gate terminal of the MOSFET MN3 and the drain terminal of the MOSFET MN1.

a source terminal of the MOSFET MN3 is grounded, and a drain terminal of the MOSFET MN3 is coupled to a gate terminal of the MOSFET MP4;

one terminal of the resistor R1 is coupled to the gate terminal of the MOSFET MP4, and the other terminal of the resistor R1 is coupled to a source terminal of the MOSFET MP4; and the source terminal of the MOSFET MP4 is coupled to the input voltage VCC, and a drain terminal of the MOSFET MP4 is coupled to the gate terminal of the MOSFET MPass.

2. The current limiting circuit according to claim 1, wherein the resistor R1 is formed by two or more resistors with different temperature coefficients.

3. The current limiting circuit according to claim 1, wherein the threshold voltage is an absolute value of a threshold voltage of the MOSFET MP4.

4. The current limiting circuit according to claim 1, wherein the ratio of a channel width to length ratio of the MOSFET MP1 to a channel width to length ratio of the MOSFET MPass is equal to or less than 1/1000.

5. The current limiting circuit according to claim 1, wherein the ratio of a channel width to length ratio of the MOSFET MN3 to a channel width to length ratio of the MOSFET MN1 is equal to or less than 1/10.

6. The current limiting circuit according to claim 1, further comprising a pair of P-channel MOSFETs MP2 and MP3, and a N-channel MOSFET MN2, and wherein a source terminal of the MOSFET MP2 is coupled to the drain terminal of the MOSFET MP1, a drain terminal of the MOSFET MP2 is coupled to the drain terminal of the MOSFET MN1, and a gate terminal of the MOSFET MP2 is coupled to a gate terminal of the MOSFET MP3;

a source terminal of the MOSFET MP3 is coupled to the drain terminal of the MOSFET MPass, a drain terminal of the MOSFET MP3 is coupled to the gate terminal of the MOSFET MP3 and a drain terminal of the MOSFET MN2;

a gate terminal of the MOSFET MN2 is coupled to the gate terminal of the MOSFET MN1, and a source terminal of the MOSFET MN2 is coupled to the source terminal of the MOSFET MN1.

7. The current limiting circuit according to claim 6, wherein the ratio of a channel width to length ratio of the MOSFET MP2 to a channel width to length ratio of the MOSFET MP3 is equal to that of a channel width to length ratio of the MOSFET MN1 to a channel width to length ratio of the MOSFET MN2.

8. The current limiting circuit according to claim 1, wherein the output pass circuit is a bipolar transistor PNP2, the current sampling circuit is a bipolar transistor PNP1, the voltage comparator is a bipolar transistor PNP4, the current to voltage converter is a resistor R1, and the current mirror circuit is formed by a pair of bipolar transistors NPN1 and NPN3, and wherein an emitter of the bipolar transistor PNP2 is coupled to an input voltage, and a collector of the bipolar transistor PNP2 is coupled to an output voltage;

a base of the bipolar transistor PNP1 is coupled to a base of the bipolar transistor PNP2, and an emitter of the bipolar transistor PNP1 is coupled to the emitter of the bipolar transistor PNP2;

a collector of the bipolar transistor NPN1 is coupled to a collector of the bipolar transistor PNP1, an emitter of the bipolar transistor NPN1 is grounded, and a base of the bipolar transistor NPN1 is coupled to a base of the bipolar transistor NPN3 and the collector of the bipolar transistor NPN1;

an emitter of the bipolar transistor NPN3 is grounded, and a collector of the bipolar transistor NPN3 is coupled to a base of the bipolar transistor PNP4;

one terminal of the resistor R1 is coupled to the base of the bipolar transistor PNP4, and the other terminal of the resistor R1 is coupled to an emitter of the bipolar transistor PNP4; and the emitter of the bipolar transistor PNP4 is coupled to the input voltage VCC, and a collector of the bipolar transistor PNP4 is coupled to the base of the bipolar transistor PNP2.

9. The current limiting circuit according to claim 8, wherein the threshold voltage is an absolute value of a threshold voltage of the bipolar transistor PNP4.

10. The current limiting circuit according to claim 8, wherein the ratio of an emitter area of the bipolar transistor PNP1 to an emitter area of the bipolar transistor PNP2 is equal to or less than 1/1000.

11. The current limiting circuit according to claim 8, wherein the ratio of an emitter area of the bipolar transistor NPN3 to an emitter area of the bipolar transistor NPN1 is equal to or less than 1/10.

12. A current limiting circuit for limiting a current passing through an output pass circuit of a voltage regulator, the current limiting circuit comprising:

a current sampling circuit for sampling the current passing through the output pass circuit to obtain a duplicated current being proportional to the current passing through the output pass circuit, wherein the output pass circuit is a P-channel MOSFET MPass, the current sampling circuit is a P-channel MOSFET MP1, the voltage comparator is a P-channel MOSFET MP4;

a current mirror circuit for producing a mirror current being proportional to the duplicated current with the duplicated current as a reference current;

a current source for producing a reference current; and a current comparator for comparing the mirror current with the reference current with and turning off the output pass circuit when the mirror current is larger than or equal to the reference current, wherein the current comparator includes a MOSFET, the current source is connected between a gate terminal and a source terminal of the MOSFET, wherein the current mirror circuit is formed by a pair of N-channel MOSFETs MN1 and MN3, and wherein a source terminal of the MOSFET MPass is coupled to an input voltage, and a drain terminal of the MOSFET MPass is coupled to an output voltage.

a gate terminal of the MOSFET MP1 is coupled to a gate terminal of the MOSFET MPass, and a source terminal of the MOSFET MP1 is coupled to the source terminal of the MOSFET MPass;

a drain terminal of the MOSFET MN1 is coupled to a drain terminal of the MOSFET MP1, a source terminal of the MOSFET MN1 is grounded, and a gate terminal of the MOSFET MN1 is coupled to a gate terminal of the MOSFET MN3 and the drain terminal of the MOSFET MN1;

a source terminal of the MOSFET MN3 is grounded, and a drain terminal of the MOSFET MN3 is coupled to a gate terminal of the MOSFET MP4;

a negative terminal of the current source is coupled to the gate terminal of the MOSFET MP4, and a positive terminal of the current source is coupled to a source terminal of the MOSFET MP4; and the source terminal of the MOSFET MP4 is coupled to the input voltage VCC, and a drain terminal of the MOSFET MP4 is coupled to the gate terminal of the MOSFET MPass.

13. The current limiting circuit according to claim 12, wherein the ratio of a channel width to length ratio of the MOSFET MP1 to a channel width to length ratio of the MOSFET MPass is equal to or less than 1/1000.

14. The current limiting circuit according to claim 12, wherein the ratio of a channel width to length ratio of the MOSFET MN3 to a channel width to length ratio of the MOSFET MN1 is equal to or less than 1/10.

15. The current limiting circuit according to claim 12, further comprising a pair of P-channel MOSFETs MP2 and MP3, and a N-channel MOSFET MN2, and wherein a source terminal of the MOSFET MP2 is coupled to the drain terminal of the MOSFET MP1, a drain terminal of the MOSFET MP2 is coupled to the drain terminal of the MOSFET MN1, and a gate terminal of the MOSFET MP2 is coupled to a gate terminal of the MOSFET MP3;

a source terminal of the MOSFET MP3 is coupled to the drain terminal of the MOSFET MPass, a drain terminal of the MOSFET MP3 is coupled to the gate terminal of the MOSFET MP3 and a drain terminal of the MOSFET MN2;

a gate terminal of the MOSFET MN2 is coupled to the gate terminal of the MOSFET MN1, and a source terminal of the MOSFET MN2 is coupled to the source terminal of the MOSFET MN1.

16. A voltage regulator, comprising:

an output pass circuit having a control terminal, an input terminal being coupled to an input voltage and an output terminal providing an output voltage;

a feedback circuit providing a feedback voltage representative of the output voltage; , an error amplifier having an inverse input being coupled to a reference voltage, a non-inverse input being coupled to the feedback voltage and an output terminal being coupled to the control terminal of the output pass circuit; and a current limiting circuit for limiting a current passing through the output pass circuit, the current limiting circuit comprising:

a current sampling circuit for sampling the current passing through the output pass circuit to obtain a duplicated current being proportional to the current passing through the output pass circuit, wherein the output pass circuit is a P-channel MOSFET MPass, the current sampling circuit is a P-channel MOSFET MP1;

a current mirror circuit for producing a mirror current being proportional to the duplicated current with the duplicated current as a reference current;

a current to voltage converter for producing a voltage being proportional to the mirror current, wherein the current to voltage converter is formed by a resistor connected between a gate terminal and a source terminal of a MOSFET, the voltage is being produced when the current goes though the resistor;

a voltage comparator for comparing the voltage produced by the current to voltage converter with a threshold voltage and turning off the output pass circuit when the voltage produced by the current to voltage converter is larger than or equal to the threshold voltage, wherein the voltage comparator includes the MOSFET, wherein the voltage comparator is a P-channel MOSFET MP4, the current to voltage converter is a resistor R1, and the current mirror circuit is formed by a pair of N-channel MOSFETs MN1 and MN3, and wherein a source terminal of the MOSFET MPass is coupled to an input voltage, and a drain terminal of the MOSFET MPass is coupled to an output voltage;

a gate terminal of the MOSFET MP1 is coupled to a gate terminal of the MOSFET MPass, and a source terminal of the MOSFET MP1 is coupled to the source terminal of the MOSFET MPass;

a drain terminal of the MOSFET MN1 is coupled to a drain terminal of the MOSFET MP1, a source terminal of the MOSFET MN1 is grounded, and a gate terminal of the MOSFET MN1 is coupled to a gate terminal of the MOSFET MN3 and the drain terminal of the MOSFET MN1;

a source terminal of the MOSFET MN3 is grounded, and a drain terminal of the MOSFET MN3 is coupled to a gate terminal of the MOSFET MP4;

one terminal of the resistor R1 is coupled to the gate terminal of the MOSFET MP4, and the other terminal of the resistor R1 is coupled to a source terminal of the MOSFET MP4; and the source terminal of the MOSFET MP4 is coupled to the input voltage VCC, and a drain terminal of the MOSFET MP4 is coupled to the gate terminal of the MOSFET MPass.

17. The voltage regulator according to claim 16, further comprising a pair of P-channel MOSFETs MP2 and MP3, and a N-channel MOSFET MN2, and wherein a source terminal of the MOSFET MP2 is coupled to the drain terminal of the MOSFET MP1, a drain terminal of the MOSFET MP2 is coupled to the drain terminal of the MOSFET MN1, and a gate terminal of the MOSFET MP2 is coupled to a gate terminal of the MOSFET MP3;

a source terminal of the MOSFET MP3 is coupled to the drain terminal of the MOSFET MPass, a drain terminal of the MOSFET MP3 is coupled to the gate terminal of the MOSFET MP3 and a drain terminal of the MOSFET MN2;

a gate terminal of the MOSFET MN2 is coupled to the gate terminal of the MOSFET MN1, and a source terminal of the MOSFET MN2 is coupled to the source terminal of the MOSFET MN1.

* * * * *